Sept. 29, 1959     F. F. OPPENHEIMER     2,906,877
CALUTRON

Filed Nov. 21, 1946                                     9 Sheets-Sheet 3

INVENTOR.
FRANK F. OPPENHEIMER
BY
*Robert A. Lavender*
ATTORNEY

Sept. 29, 1959 F. F. OPPENHEIMER 2,906,877
CALUTRON
Filed Nov. 21, 1946 9 Sheets-Sheet 5

INVENTOR.
FRANK F. OPPENHEIMER
BY
ATTORNEY

Sept. 29, 1959      F. F. OPPENHEIMER      2,906,877
CALUTRON

Filed Nov. 21, 1946      9 Sheets-Sheet 6

INVENTOR.
FRANK F. OPPENHEIMER
BY
ATTORNEY

Sept. 29, 1959    F. F. OPPENHEIMER    2,906,877
CALUTRON
Filed Nov. 21, 1946    9 Sheets-Sheet 7
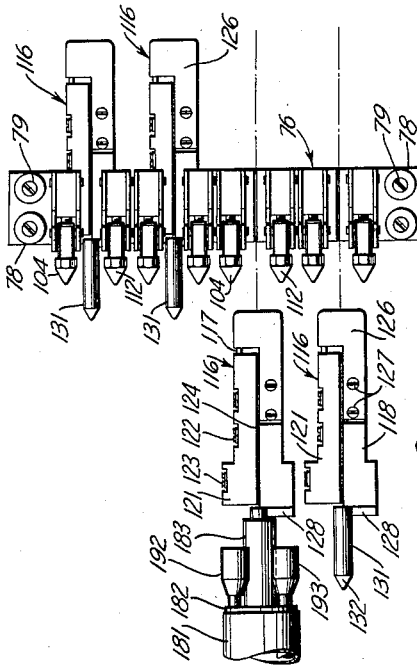
Fig. 12
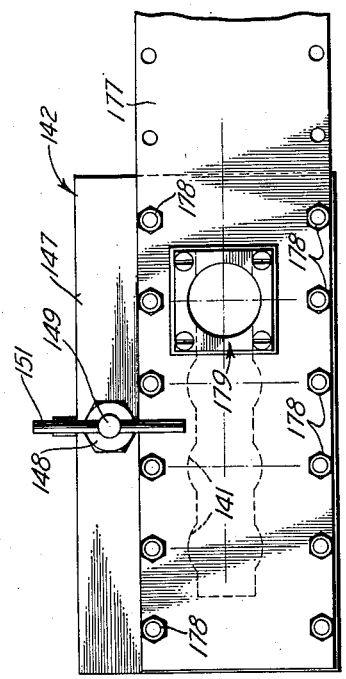
Fig. 11
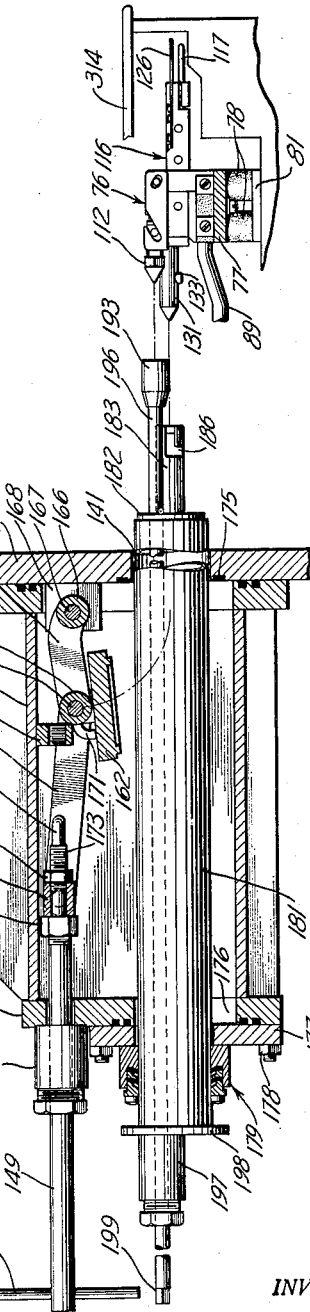
Fig. 10
INVENTOR.
FRANK F. OPPENHEIMER
BY
ATTORNEY INVENTOR.
FRANK F. OPPENHEIMER
BY
Robert A. Lavender
ATTORNEY Sept. 29, 1959      F. F. OPPENHEIMER      2,906,877
CALUTRON Filed Nov. 21, 1946      9 Sheets-Sheet 9

INVENTOR.
FRANK F. OPPENHEIMER
BY
*Robert A. Lavender*
ATTORNEY

United States Patent Office 2,906,877
Patented Sept. 29, 1959

2,906,877

CALUTRON

Frank F. Oppenheimer, Berkeley, Calif., assignor to the United States of America as represented by the United States Atomic Energy Commission Application November 21, 1946, Serial No. 711,427

9 Claims. (Cl. 250—41.9)

The invention relates to material separating devices and particularly to devices for the ionic segregation of materials such as isotopes and is of a form referred to generally as a calutron, other forms of which are illustrated in U.S. Patent No. 2,709,222, which issued to Ernest O. Lawrence, on May 24, 1955.

In the construction and operation of devices of this type, the endeavor is always to increase the output of a unit without requiring any less effective separation. It is also considered important always to utilize as much of the available equipment as possible since the complexity and cost of an original installation are so great that any other procedure is not economically feasible. As a result of a great deal of practical experience, it has been determined that one of the chief practical difficulties is the misalignment of various parts of the structure. Not only is this a difficulty originally, but during the operation of the structure and after it has been operated, it is observed that thermal warping occurs so that during and after operation, the condition and relative position of the parts are not constant or as originally set. It has also been the experience that one of the most vulnerable parts of the structure is the electron emitting filament. Perhaps more than any other one thing, filament failure is the cause of interruption of operation. The general mechanical excellence of the structure is now such that continuous runs of a week or so are readily obtained except in so far as such runs may be interrupted by filament failure. Various different expedients have been resorted to to increase filament life. Yet, there is still difficulty with run termination due to filament failure.

It is therefore an object of the invention to provide a structure of the calutron type in which the filaments are so incorporated that they can be removed and replaced without otherwise interrupting the operation of the structure.

An additional object of the invention is to provide means for facilitating the initial accurate adjustment of the various operating components of the device and also for providing means for resetting or adjusting portions of the structure after thermal warping or other displacements have occurred.

Other objects of the invention, together with the foregoing, are attained in the embodiment of the invention illustrated in the accompanying drawings, in which:

Fig. 10 is a view similar to Fig. 6, but showing the cathode removing tool in position;

Fig. 11 is a front elevation of the structure shown in Fig. 6;

Fig. 12 is a detail to an enlarged scale, showing in plan and diagrammatically the use of the cathode removing tool in connection with the removable cathode;

Figure 1:
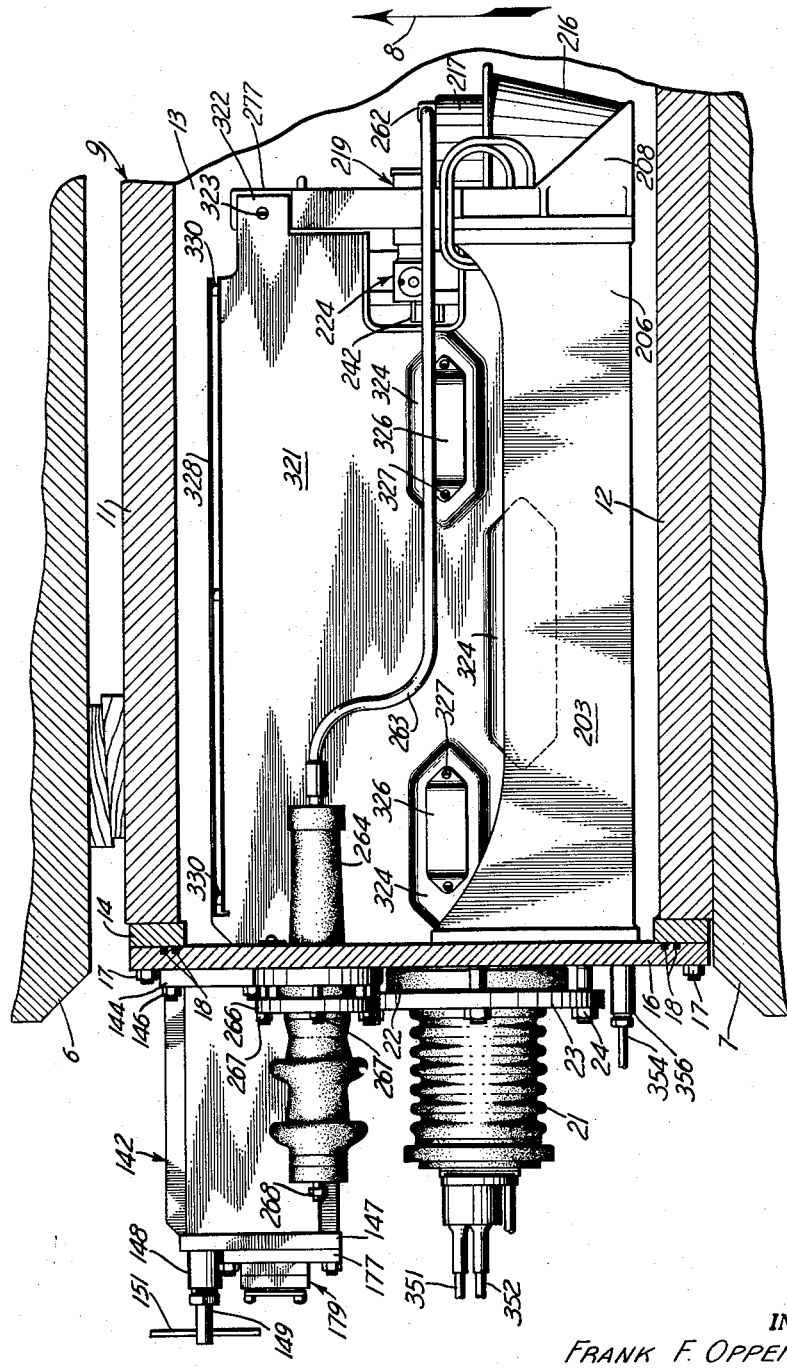
Figure 1 is a side elevation of a structure in accordance with my invention installed in a calutron tank and magnet, the latter being disclosed in cross section and in fragmentary form.

In its preferred form, the device of my invention incorporates a plurality of ion source mechanisms arranged in order to provide a multiple unit, each of the mechanisms incorporating an arc discharge structure for ionizing purposes and having a filament mounted in a removable cartridge manipulable from exteriorly of the vacuum chamber and replaceable through a vacuum lock. The multiple unit ion source mechanism is provided also with a multiple accelerator mounted for adjustment in a number of different senses and provided with suitable locking means for establishing the selected or set values. Comparably, the structure is likewise provided with a multiple decelerator mechanism settable by a plurality of locked adjustments.

The particular embodiment of the invention illustrated in the accompanying drawings is installed in an electromagnet represented by a pole piece 6 and a pole piece 7, between them furnishing a magnetic field having a flux direction as indicated by the arrow 8. The magnetic field extends generally homogenously throughout the volume between the pole pieces and permeates a vacuum envelope 9, generally referred to as a tank and constituted of an upper wall 11, a lower wall 12, and suitable side walls 13, as well as an apertured front wall 14. The tank 9 is connected by any suitable means (not shown) to a vacuum pumping apparatus so that under normal operation, with the tank hermetically sealed and with the pumps effective, the pressure within the tank 9 can readily be reduced to a value ranging from $10^{-5}$ mm. Hg to $10^{-4}$ mm. Hg. The various accouterments of the tank 9 are not herein described in detail, as they are disclosed, at least in type form, in the above-mentioned patent of Lawrence, the present interest being in the source mechanism illustrated herein as designed and arranged for incorporation in the mentioned environment.

Figure 2:
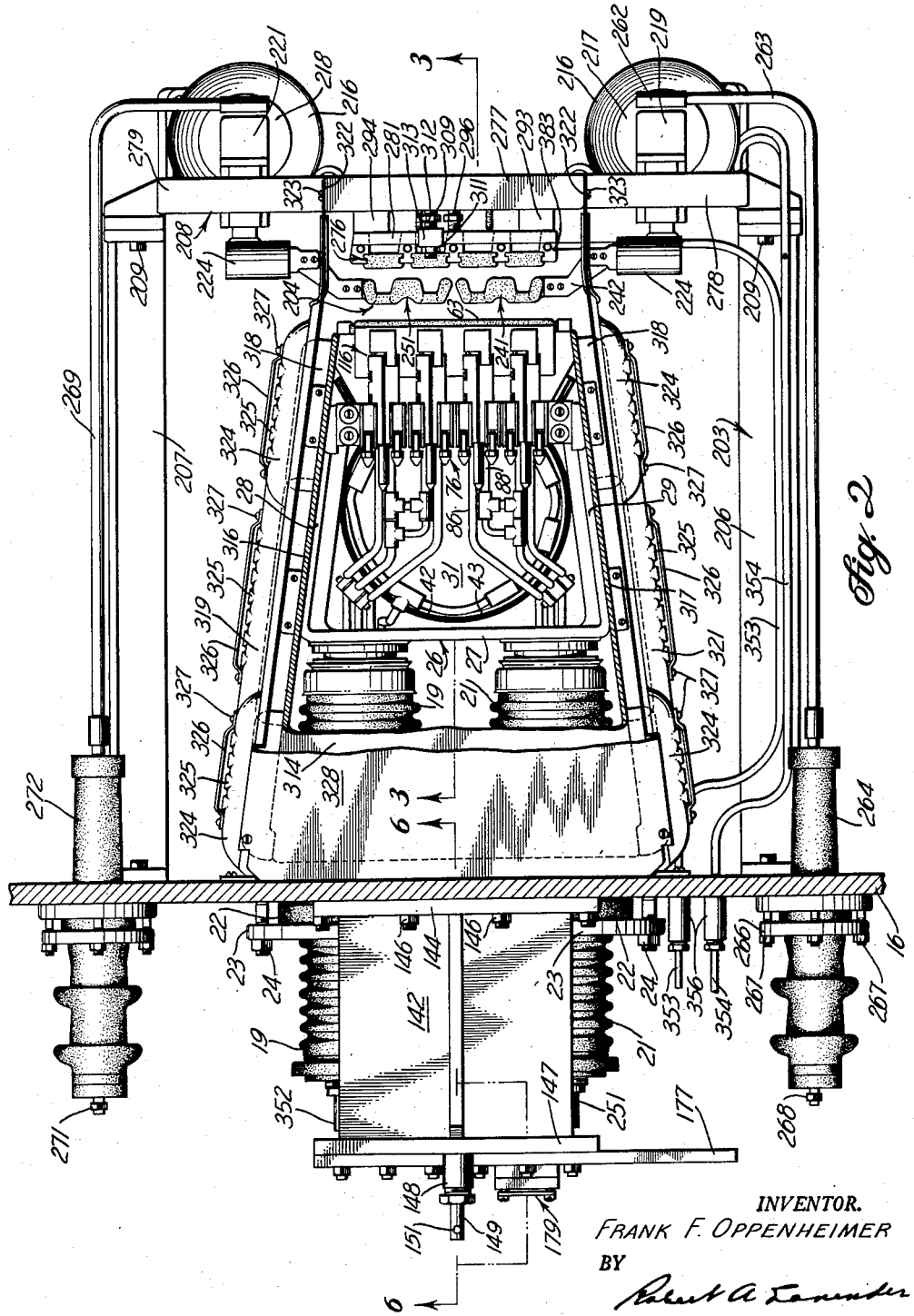
Fig. 2 is a plan of the structure shown in Fig. 1, a portion of the cover sheet and shields being removed to disclose the interior construction.
Figure 4:
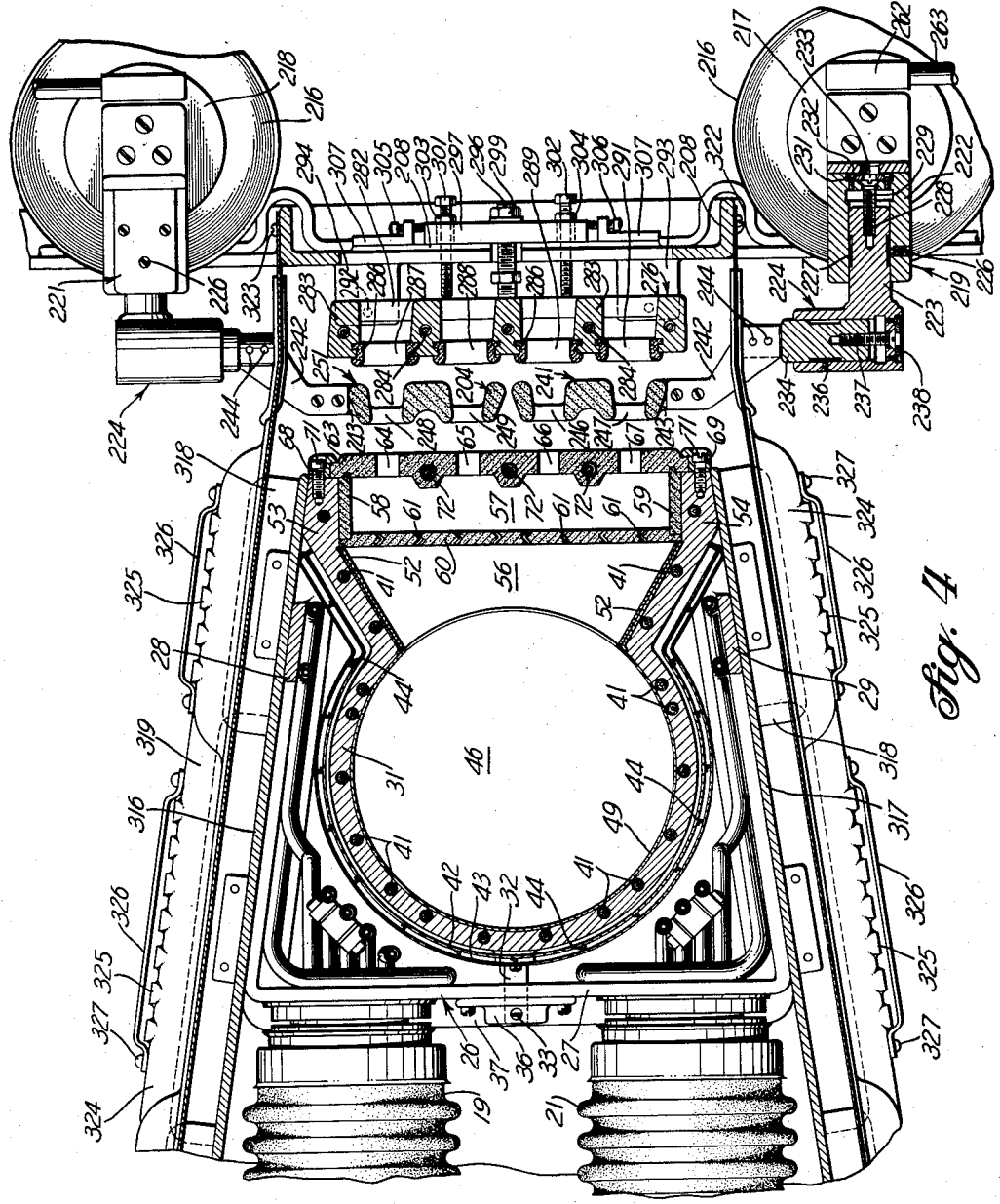
Fig. 4 is a cross section, the plane of which is indicated by the line 4—4 of Fig. 3.

Referring to Figs. 1, 2 and 4, there is shown removably mounted no the plate 14 a face plate 16 held in position by fastenings 17 and maintained in vacuum tight relationship with the tank 9 by gaskets 18. The face plate 16 is metallically connected to the tank 9 so it is at the same electrical potential as said tank and, in addition, it serves as a support for a pair of electrically insulating bushings 19 and 21, arranged with their axes mutually parallel and normal to the direction 8 of the magnetic field. Each of the bushings intermediate its ends has a projecting flange 22 held in vacuum tight and mechanically supporting relationship to the face plate 16 by a suitable clamping annulus 23 held by fastenings 24. At their inner ends, that is, at their ends inside the tank 9, the bushings 19 and 21 are connected to and serve as supports for a metallic frame 26 having a generally planar wall 27 from which project converging side walls 28 and 29. In this fashion, the frame 26 is rigidly mechanically mounted on the face plate 16 but is electrically insulated therefrom in order that it may be operated at a different electrical potential from the grounded face plate.

The side walls 28 and 29 serve as pivotal supports for a vapor block casting 31 mounted thereon for rocking movement about an axis extending transversely of the magnetic field and also at right angles to the axes of the insulators or bushings 19 and 21. In order that this pivotal adjustment may be accurately regulated and set, the casting 31 is provided with an attached bracket 32 disposed between a pair of set screws 33 and 34, respectively, engaging opposite sides of the bracket 32 and seated for adjustment in flanges 36 and 37 projecting from the wall 26. By appropriately rotating the screws 33 and 34, the bracket 32 is moved, and consequently, the block 31 is rotated about the above-mentioned axis. The provision of this adjustment makes it possible quite accurately to set the position of the block 31 or to correct for misalignments after operation of the block.

Figure 3:
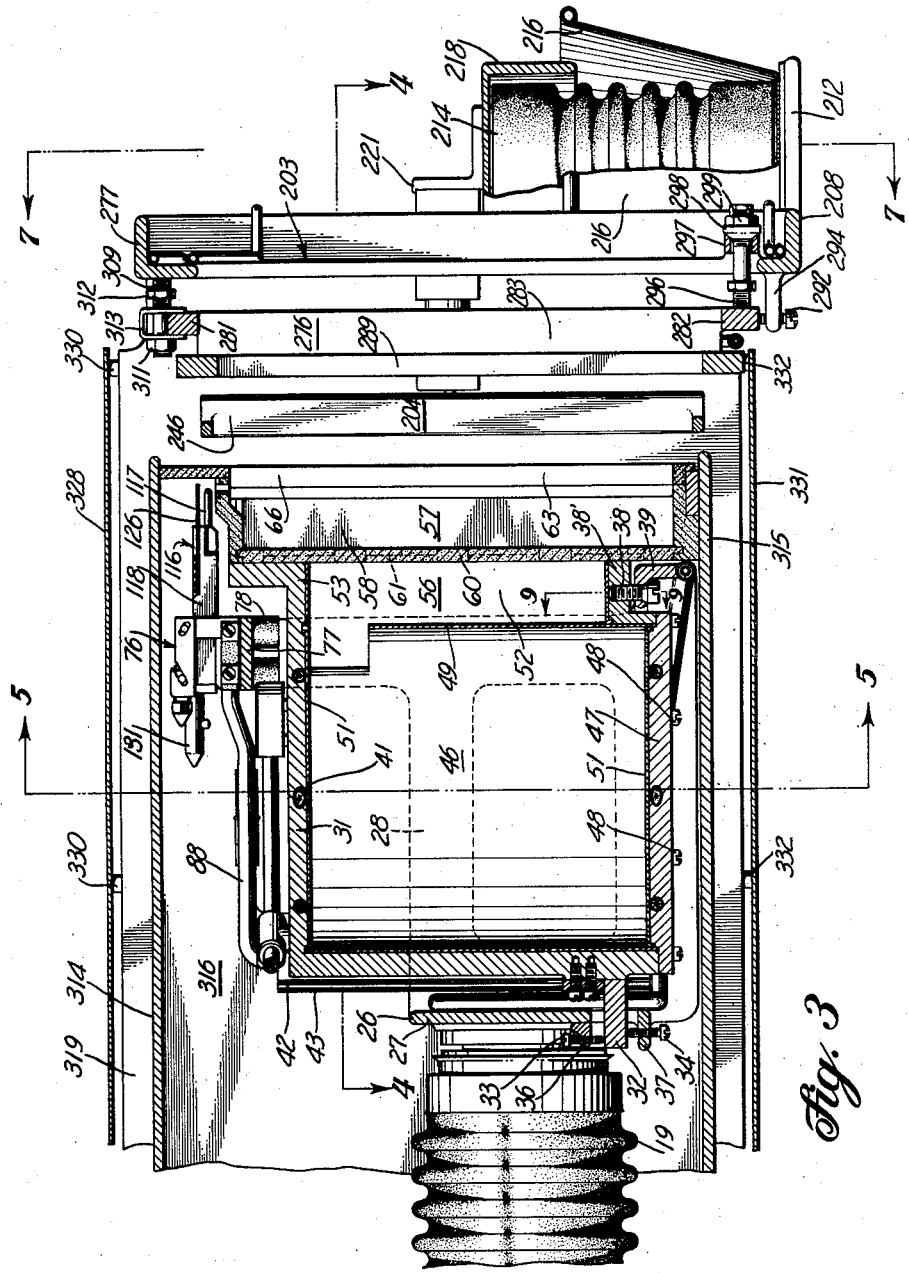
Fig. 3 is a cross section, the plane of which is indicated by the line 3—3 of Fig. 2.
Figure 9:
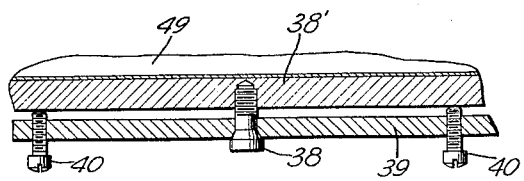
Fig. 9 is a cross section, the plane of which is indicated by the line 9—9 of Fig. 3.

Adjustable supporting means are also provided at the opposite end of casting 31, as best seen in Figs. 3 and 9, and take the form of bolt 38 threaded into a recess in a bracket 38' secured to and extending forwardly from casting 31, the bolt 38 passing through a cross member 39 on frame 26. Set screws 40 are provided to retain the casting 31 solidly in adjusted position.

The block 31 is preferably cast of a metal having good thermal properties and is fabricated to include a number of passes of an electrical heating element 41 which, when energized, is effective to increase the temperature of the block and to impart heat to material contained therein. In order to conserve such heat, the block 31 is largely encompassed by a plurality of sheets 42 and 43 positioned by interposed spacers 44 and constituted of relatively thin metal spaced apart to serve as poor transmitters of heat energy, especially by conduction. They are preferably of a bright surface in order to serve as reflectors of radiant energy back into the block 31.

The block 31 is formed with a relatively large cavity 46 for the reception of a charge bottle, that is, a container of material to be processed or separated. The container of such material is preferably introduced through the bottom of the cavity 46, there being provided a removable bottom plate 47 secured to the remainder of the block 31 by fastenings 48. In view of the chemically destructive nature of the material within the charge container and processed by the mechanism, the interior of the casting 31 is conveniently lined with a protecting shield in the nature of a lining sheet 49, overlying the generally circular cylindrical wall of the casting, and also certain additional sheets 51 and 52 for protecting other otherwise exposed block surfaces.

When a suitable charge is disposed within the cavity 46 and the heaters 41 are operating, a vapor is evolved which travels from the cavity 46 toward the interior of the tank 9, as the pressure within the tank is maintained at a relatively low value. A passage for the vapor evolved within the cavity 46 is provided by flaring walls 53 and 54, in part defining a diverging passageway 56 leading to a diffusion chamber 57 similarly defined by the extended walls 53 and 54. Diffusion chamber 57, also being subject to deterioration by the material handled, is appropriately provided with linings 58 and 59, the lining preferably being graphite or a comparable material because of the greater thermal deterioration and stress.

To assist in a uniform flow and distribution of the vapor, the diverging chamber 56 and the diffusion chamber 57 are separated by an interposed baffle plate 60 preferably constituted likewise of graphite and appropriately pierced by a number of apertures 61 affording communication between the chambers 56 and 57. Yet, in order to preclude rectilinear vapor flow and possible return electron bombardment, the passages 61 are not made directly through the baffle 60 but enter the baffle from opposite sides at different angles and intersect within the body of the baffle to afford passageways that appear chevron-shaped in a cross section of the baffle, as shown in Fig. 4.

In the present embodiment, the unit is designed to operate with a plurality of arc discharges for ionizing purposes and in the illustrated instance, four arc discharges are employed. For this reason, the casting 31 is closed at one end by an overlying graphite arc plate 63 having therein, in regular array, four arc openings 64, 65, 66, and 67, respectively. These openings are generally rectangular in aspect and are considerably longer than they are wide or than they are deep. They are usually referred to as arc slits. The plate 63, being graphite, is conveniently held in place by marginal strips 68 and 69, in turn secured in position by machine screws 71 engaging the flared walls 53 and 54 of the casting 31. The plate 63 is also utilized as a retainer for the graphite lining plates 58 and 59 and the baffle 60, these pieces being suitably recessed or rabbeted in order that their relative positions will be accurately established and maintained and also in order that they can readily be removed and replaced after deterioration in operation.

Some heat is conducted through the flaring walls 53 and 54 from the heaters 41 to the marginal portions of the arc plate 63, and in order that a relatively uniform supply of heat to all portions of such plate may be obtained, the plate is thickened in the central portion and between the several arc slots to accommodate additional electrical heaters 72. In this fashion, all of the parts of the casting 31, subject to vapor flow, are provided with means for preventing the deposition or condensation of vapor thereon, in the nature of suitable heaters, so that the temperatures of the various portions of the casting 31 can be maintained suitably high to avoid deposit.

Figure 13:
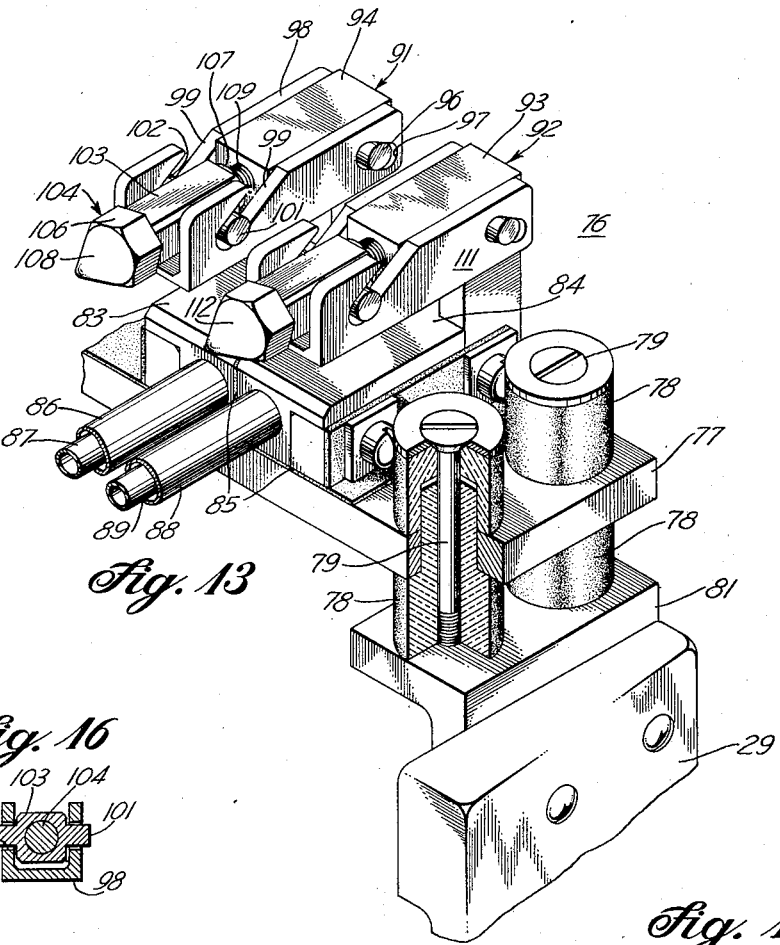
Fig. 13 is an isometric view of the cathode supporting structures, various portions being broken away to show in cross section the interior construction.
Figure 16:
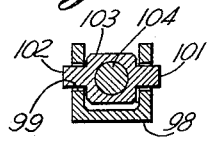
Fig. 16 is a cross section, the plane of which is indicated by the line 16—16 of Fig. 14.
Figure 14:
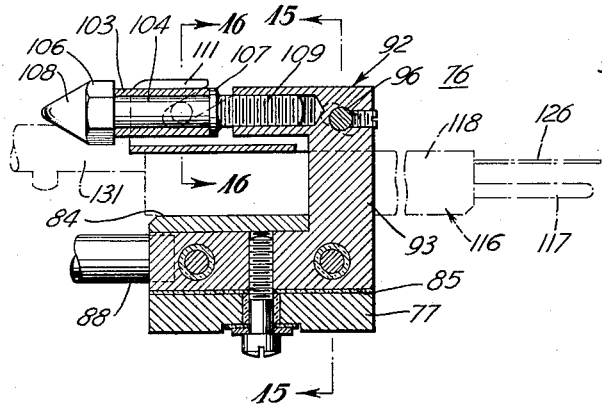
Fig. 14 is a fragmentary cross section, substantially on a vertical, axial plane, of the cathode clamping mechanism illustrated in Fig. 13.
Figure 15:
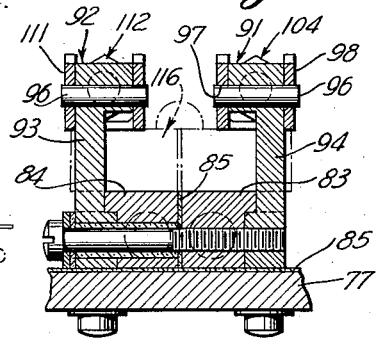
Fig. 15 is a cross section, the plane of which is indicated by the line 15—15 of Fig. 14.

Referring to Figs. 12, 13 and 14, there is shown, incorporated as a part of the ion producing mechanism, filament structures generally designated 76. Since there are four arcs in the present unit, there are correspondingly four filament structures. These are mounted on a supporting strap 77 carried on suitable insulators 78 and held by fastenings 79 to brackets 81 secured to the walls 28 and 29, respectively. Since all of the filament structures are identical, a description of but one of them applies equally to the others.

In accordance with the present invention, the filament structures are readily removable during continued operation of the remaining part of the structure, and for that reason, the strap 77 serves as a mounting for a pair of anchor blocks 83 and 84, respectively, fastened thereto mechanically, but electrically insulated by interposed nonconducting material such as mica sheets 85. Current is led to the block 83 by a pair of cooling water tubes 86 and 87 arrayed concentrically and mechanically fastened to the anchor block so that electrical continuity is established. Comparably, the block 84 is similarly supplied with cooling water and with electricity by squirt tubes 88 and 89. In this fashion, there is provided a pair of electrically insulated blocks 83 and 84 at different potentials.

Each of the blocks is provided with suitable clamping devices, generally designated 91 and 92. Secured to and projecting from the block 83 is a J-shaped upright 94 having a through pin 96 projecting from opposite sides thereof to engage oblique slots 97 in the side walls of a metallic channel 98 within which the block 94 is nested. Oppositely inclined oblique slots 99 are formed in an adjacent portion of the channel 98 to engage oppositely projecting pintles 101 and 102 on a sleeve 103 rotatably engaging a special bolt 104 and axially confined between a hexagonal shoulder 106 and a collar 107 on the bolt. The hexagonal end of the bolt terminates in a conical cap 108 whereas the opposite end is provided with threads 109 engaging internal threads within the J-shaped block 94.

When a suitable tool is engaged with the hexagonal end 106 and the bolt 104 is rotated, the action of the pintles 101 and 102 in the slots 99 and the similar action of the ends of the through pin 96 in the slots 97 is to afford a trans'ation of the channel 98 toward and away from the opposite block 83, thus the space between the block and the channel is increased or decreased pursuant to the sense of rotation of the bolt 104. The mechanical seat of the various pins and pintles in the cooperating slots and the inclination of the slots themselves, as well as the fineness of the threads on the bolt 104, makes it possible for the channel 98 in effect to fit itself on any member interposed between the anchor block 83 and the channel and to exert a substantial gripping or clamping force on any interposed member. In an entirely comperable fashion, the block 93 associated with the anchor block 84 is provided with a clamping channel 111 suitably actuated upon rotation of a conically capped hexagonal bolt 112.

Figure 17:
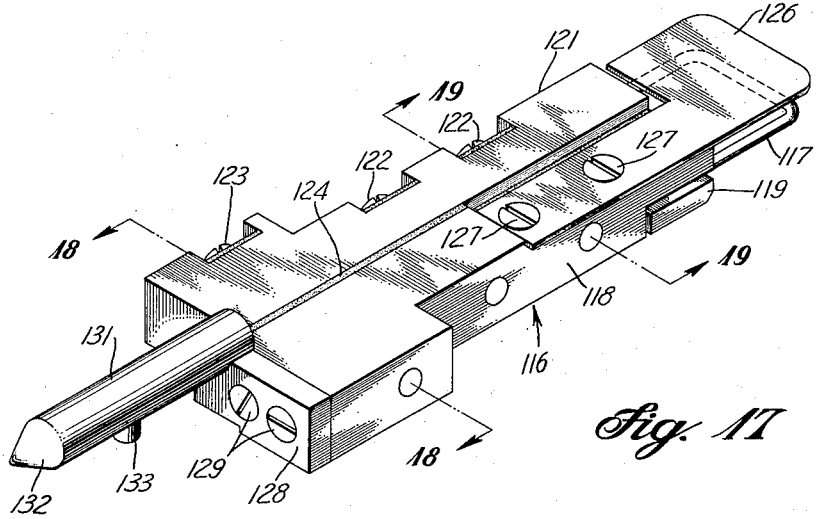
Fig. 17 is an isometric perspective of a removable cathode constructed in accordance with the invention.
Figure 18:
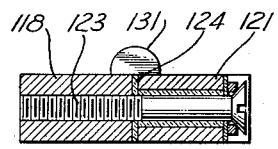
Fig. 18 is a cross section, the plane of which is indicated by the line 18—18 of Fig. 17.
Figure 19:
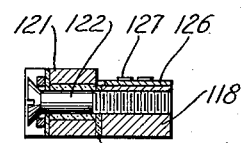
Fig. 19 is a cross section, the plane of which is indicated by the line 19—19 of Fig. 17.
Figure 20:
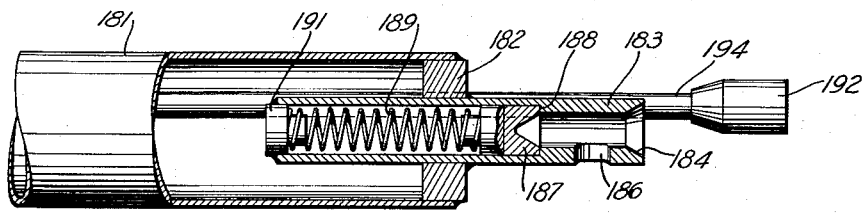
Fig. 20 is a fragmentary view of one end of the cathode handling tool, the figure being in cross section for the most part on a vertical, axial plane.
Figure 21:
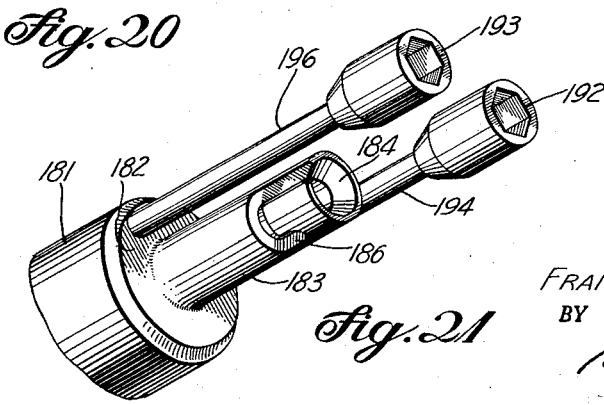
Fig. 21 is an isometric perspective of the cathode engaging and of the cathode removing tool.

Designed to be clamped between the channels 98 and 111 and their respective anchor blocks 83 and 84 is a filament assembly 116 illustrated in detail in Fig. 17. This filament assembly has been given the name of "cartridge" cathode. Included in the assembly is a thermally energized electron emitting filament wire 117 in the usual U-shaped form and fabricated of tungsten, tantalum, or other comparable material. One of the legs of the U-filament is individually clamped between a block 118 and a securing plate 119 fastened thereto by a suitable means. Comparably, the other leg of the filament 117 is clamped to a block 121 by an appropriate cap. Since the two blocks 118 and 121 operate at different electrical potentials, they are mechanically secured together by through fastenings 122 and 123 threadedly engaging the block 118 but being well insulated electrically from the block 121. In addition, these blocks are electrically separated by an interposed layer 124 of an insulating material such as mica.

It is customary that the upper portion of the filament 117 be shielded and consequently a plate 126 overlies the filament and is secured to the block 118 by fasteners 127.

In order to provide means for handling the cartridge cathode, that is, to permit its withdrawal from the remaining portion of the mechanism during operation or to permit its introduction into functioning position during operation of the remaining part of the structure, means are provided affording a ready mechanical support of a disconnectable nature. For that reason, secured to the block 118 is a plate 128 fastened in position by suitable screws 129 and carrying an axial rod 131 having a conical terminus 132 and a radially projecting pin 133. When the rod 131 is engaged by a suitable handling device or tool, the filament or cathode assembly 76, as shown in Fig. 14, can be translated into a position between the upright members 91 and 92 with the block 118 disposed between the anchor block 84 and the clamping channel 111 and with the block 121 disposed between the anchor block 83 and the channel 98. When the channels are suitably tightened, the cartridge cathode is firmly clamped in place, electrical contact is effectively made, and thermal conduction is suitable for transfer of excessive heat into the cooling tubes 86 and 88. The shoulders on the blocks 121 and 118 abut the upright portions of the members 91 and 92 so that the filament 117 is positioned with the requisite accuracy. In this fashion, there is provided a filament which is removable, yet is readily clamped in place for electric and thermal conduction and which is positioned as accurately as a permanently installed filament.

In accordance with the invention, there is provided a suitable tool and handling mechanism so that the cartridge cathode can be removed, for example, without otherwise disturbing the operation of the structure. As patricularly illustrated in Figs. 10 to 12 and 17 to 21, the face plate 16 is provided with a plurality of apertures such as 141, each of a sufficient size to pass the entire cartridge cathode and disposed in axial alignment therewith. Each of the cartridge cathodes is provided with an identical mechanism; consequently, the following description of one of such mechanisms applies equally to the others.

Figure 6:
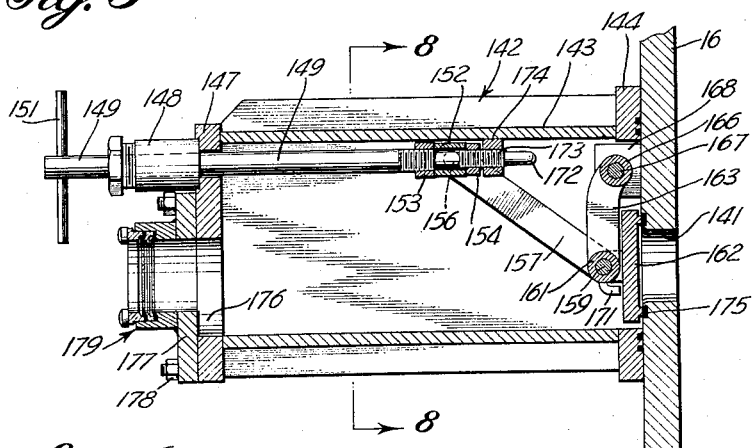
Fig. 6 is a cross section, the planes of which are indicated by the lines 6—6 of Fig. 2.

The aperture 141 affords communication between the interior of the tank 9 and the interior of the vacuum lock chamber 142. This chamber is made up of a generally rectangular shell 143 having an annular end wall 144 held in vacuum tight relationship with the face plate 16 by suitable fastenings 146. Also included in the chamber boundaries is an end plate 147 serving as the mounting for a guide and sealing gland 148. Passing through and freely movable within the guide and sealing gland 148, both in axial translation and in rotation, is an operating rod 149 provided with an external handle 151 and carrying a freely rotatable yoke 152 (Fig. 6) confined on the rod by a pair of jam nuts 153 and 154. The yoke 152 has a pair of pins 156 projecting therefrom and engaging a pair of pivoted links 157 and 158 extending to a pin 159 fastened in bosses 161 outstanding from and forming part of a closure plate 162. Also engaging the pin 159 fastened in bosses 161 outstanding from and forming part of a closure plate 162. Also engaging the pin 159 is a pair of arms 163 and 164 united in a sleeve, surrounding pin 159 at one end, and at the other end having a hub 166 journaled on a pin 167 mounted in brackets 168 and 169, respectively, suitably secured to the face plate 16.

With this mechanism, translation of the rod 149 is effective to operate the links 157 and 158 of the pair of arms 163 and 164 as a toggle mechanism to swing the plate 162 toward or away from a position overlying the aperture 141. Since the plate 162 is journaled upon the pin 159, a stop lug 171, while allowing some freedom of adjustment and motion, is effective to hold the plate substantially in proper position. As it is desired not only to have the quick operation of the plate 162 that can be readily produced by free translation of the rod 149, but also to have a firm clamping arrangement, the rod 149 adjacent one end is provided with a pilot projection 172 merging with a threaded portion 173 adapted to be guided into and to engage a threaded lug 174 depending from the wall 143 of the chamber.

With this structure, after the plate 162 has been positioned substantially in contact with the gasket 175 surrounding the aperture 141, and after the pilot 172 has guided the threads 173 into engagement with the threaded lug 174, subsequent rotation of the handle 151 causes a further collapsing of the toggle links and affords a way of exerting large pressures upon the gasket 175 to afford a vacuum tight seal. Upon the reverse operation, that is, first unscrewing the rod 149 and then withdrawing it after the threads 173 have left the lug 174, the toggle links straighten and the plate 162 is moved into its normal position out of the way of the aperture 141, as shown in Fig. 10.

The chamber wall 147 is provided with an aperture 176 in approximate alignment with the aperture 141 and in part covered by a closure plate 177 secured in position by fasteners 178. The closure plate is provided with a guiding and sealing member 179 of an appropriate size to receive a removable cartridge cathode tool. This tool is especially illustrated in Figs. 10, 20, and 21 and comprises a generally cylindrical tubular body 181, at its inner bore closed by a plug 182 carrying a coaxial sleeve 183. The projecting end of the sleeve is provided with a conical bore 184 and a bayonet slot 186. The sleeve 183 is interiorly provided with a plug 187 spring pressed against an internal shoulder 188 by a helical spring 189 seated on the plug 187 and also seated on a plug 191 fastened in the end of the sleeve 183.

In this fashion, there is provided a resilient bayonet connector, yet there is no communication between the exterior and the interior of the tube 181. Thus, the tube being of proper diameter can readily be introduced through the seal and guide 179 to bear loosely within the aperture 141 with the bayonet connection substantially aligned with the rod 131. As the tool axially approaches such rod, the conical bore 184 cooperates with the cap cone 132 to guide the parts into telescoping arrangement and when the tube 181 is rotated into proper oriented position, the bayonet slot 186 accommodates the pin 133 guiding the parts while the conical cap 132 engages the plug 187 and displaces it against the pressure of the spring 189. Upon a subsequent turning motion of the tube 181 and a release of the tube, the spring is effective slightly to retract the tube 181 but with the pin 133 spring locked in the dead end of the bayonet slot 186 so that, in effect, the tool and the cartridge cathode are firmly joined.

In this position of the parts, the tool is effective to align a pair of socket wrenches 192 and 193, respectively, with the fastening bolts 104 and 112. The socket wrenches 192 and 193 are each provided with elongated stem rods 194 and 196, respectively, rotatably and translatably supported in the plug 182, and are each provided with a pair of vacuum supports and seals 197 mounted on an end plate 198 closing the end of the tube 181. The rods 194 and 196 are each formed with non-circular ends 199 for the reception of a suitable tool.

When the sleeve 183 is first engaged with the cartridge cathode, the socket wrench ends 192 and 193 are retracted, as shown in Fig. 12, but as soon as the connection has been made, the socket ends are then advanced into engagement with the nuts 104 and 112 and are appropriately rotated to release the clamps which hold the cartridge cathode in place. At the conclusion of such operation, the socket wrenches are then individually retracted as far as possible and the tool 181, still further engaging the cartridge cathode, is withdrawn partially. This is effective to remove the cathode from clamped position and to retract it to the interior of the chamber 142 and out of the path of the plate 162, yet with the tube 181 still lying within the guide and seal 179. With the parts in this position, the rod 149 is translated and rotated to close the aperture 141 and then the sleeve 183 and the cathode continue their withdrawing movement to the outside atmosphere. In this way, the remaining portion of the operation is by no means interrupted and since the pumps operate continuously, the pressure is altered but little due to the necessary evacuation of the chamber 142. By a reversal of the described process, a new cartridge cathode can be put into place and the operation of the particular arc to which that cartridge cathode pertains can then be continued.

Referring to Figs. 1 to 4, 7 and 8, in accordance with the customary constitution of a calutron type mechanism, there is provided in the present structure an accelerator mechanism, generally designated 204. For the purpose of supporting this structure, the face plate 16, at suitably spaced locations, is provided with a frame 203 having means for securing it to the face plate and extending into the tank 9 and underlying the vapor block 31. The frame 203 preferably includes not only side arms 206 and 207 but also a bridge member 208 suitably fastened to pads at the extremities of the side arms 206 and 207 by fastenings 209.

The bridge member 208 at either side carries a pair of pads 211 and 212, respectively, serving as supports for a pair of insulators 213 and 214, respectively, disposed with their axes parallel to the magnetic field and for the most part surrounded by conical shields 216. The insulators at their upper ends are provided with caps 217 and 218 (Fig. 7), each of which depends to shield part of the insulator it surrounds and extends slightly into the compass of the shield 216. The caps 217 and 218 each support adjusting brackets 219 and 221. Since the structure incorporated in each of the adjusting brackets and the mechanism supported thereby are either identical or identical except for reverse symmetry, a description of but one applies equally to the other.

The adjusting bracket 219, as best seen in Fig. 4, includes a tubular member 222 within which is slidably disposed one arm 223 of an elbow member, generally designated 224. The arm 223 is permitted to move axially but is prevented from turning by a machine screw such as 226 engaging a slotted portion 227 of the arm. In order that the arm may be moved appropriately, the interior thereof is counter-bored and threaded as at 228 to receive a machine screw 229 freely rotatable within the device 222 but prevented from axial translation inasmuch as the head of the machine screw is journaled between the main body of the member 222 and a cap 231 held thereon by screws 232 and provided with an opening 233 to accommodate an actuating screw driver.

Upon rotation by engagement of a screw driver with the head of the machine screw 229, the arm 223 is moved in and out with respect to the support bracket. A quite comparable arrangement is provided with the arm 224 except that this arm, itself being hollow, accommodates a rod 234 prevented from turning by a restraining screw 236 but axially translated by a machine screw 237 rotatably mounted through the head of a cap 238. As the screw 237 is rotated, the stub shaft 234 is advanced and retracted.

This motion is utilized appropriately to position a pair of accelerator electrodes, generally designated 241, made as a unit preferably of graphite and held in position by a metal clamp 242 engaging a fin 243 formed integrally with the unit 241. The bracket 242 is permanently secured by pins 244 to the stem 234. In this fashion, there is provided a pair of accelerator apertures 246 and 247 that can be accurately positioned with respect to their adjacent arc slots 66 and 67. With this adjustment, not only can the initial setting be accomplished but any subsequent shifts necessitated by operating changes can quite readily be effectuated. In a similar fashion, integral accelerator body 251, having accelerator slots 248 and 249 co-operating with the arc slots 64 and 65 is disposed on the adjusting mounting 221.

While current for maintaining the various accelerator electrodes at the desired potential is of only moderate quantity, still it is preferred to afford separate leads for each of the accelerator bodies 241 and 251. Yet, since these leads are identical except for reversed symmetry, a description of one of them applies also to the other.

For example, with reference to Fig. 1, to the cap 217 is secured a terminal block 262 also joined to a conductor 263 following approximately the contour of the frame 203 and extending to and through the center of an insulating bushing 264, which in turn is clamped on the face plate 16 by a ring 266 and fastenings 267 and terminates in a fastening 268 for the reception of a suitable conductor for including the accelerator in appropriate electrical circuit. Similarly, referring to Fig. 2, the cap 218 is provided with a conductor 269 led from the interior of the tank to a terminal 271 through a suitably mounted insulating bushing 272.

In this fashion, the mechanism is provided with an electrically separate but mechanically joined accelerator structure adjustable with respect to the source unit for ready setting prior to operation and for facile readjustment after operation.

Figure 5:
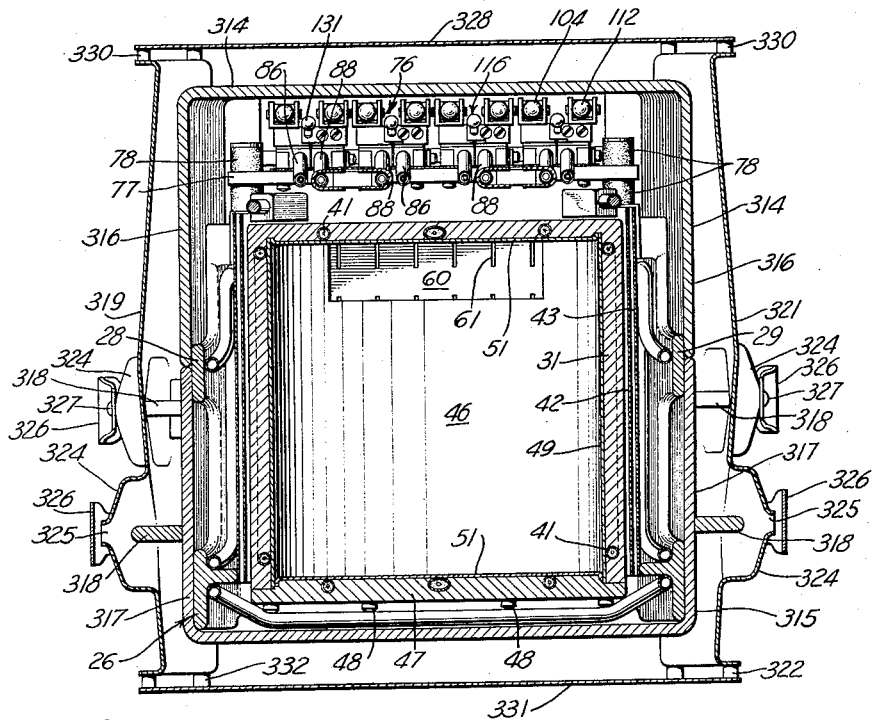
Fig. 5 is a cross section, the plane of which is indicated by the line 5—5 of Fig. 3.
Figure 7:
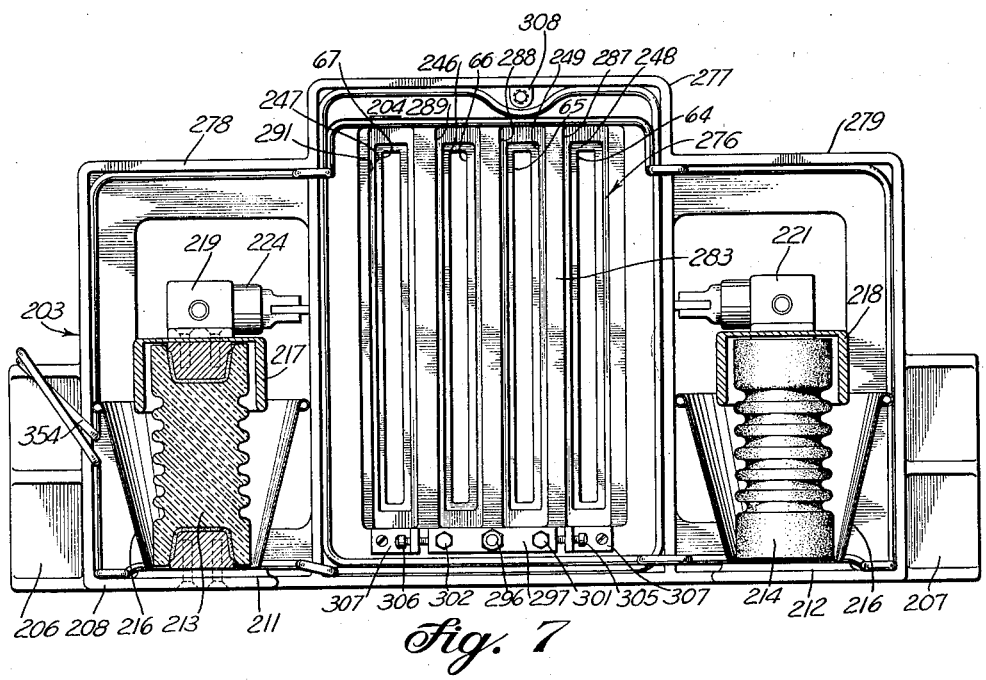
Fig. 7 is a cross section, the plane of which is indicated by the line 7—7 of Fig. 3.
Figure 8:
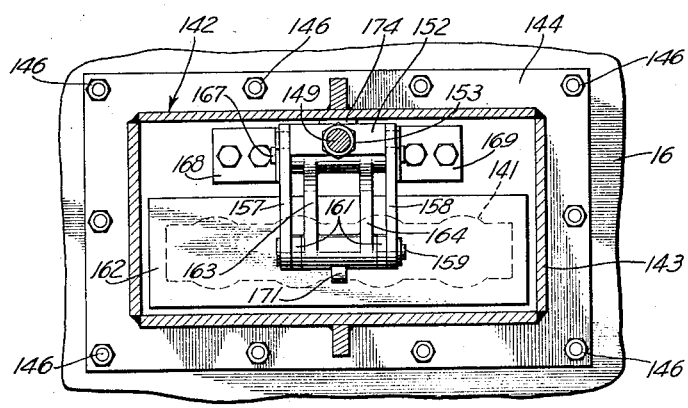
Fig. 8 is a cross section, the plane of which is indicated by the line 8—8 of Fig. 6.

Referring to Figs. 4, 5, and 7, there is shown, included with the source unit, in addition to the accelerator, a decelerator mechanism, generally designated 276. To accommodate this mechanism, the bridge 208 is extended upwardly as best seen in Fig. 7 to provide a central rectangular frame 277 buttressed at either side by smaller frame members 278 and 279, respectively, so that the entire bridge and front end frame construction is a rigid body well braced in all directions, yet of a skeleton form to reduce uneven warping and distortion. The decelerator mechanism 276 (Fig. 3) comprises a grid having a top bar 281 and a bottom bar 282 joined at appropriate intervals by upright ribs 283 (Fig. 4). The ribs are each thick enough to accommodate an integrally cast heater 284 so that the temperature of the frame 276 can be maintained at the desired value to preclude the deposition thereon of condensed vapor.

The ribs 283 are respectively contoured to interlock with rabbeted graphite decelerator slot bodies 286 as well as being contoured to provide a central aperture 287 constituting a decelerator slot approximately in alignment with the accelerator slots and the arc slots, that is, the decelerator slot 287 is in alignment with the accelerator slot 248 while the decelerator slots 288, 289 and 291 are respectively aligned with the accelerator slots 249, 246 and 247.

In order appropriately to support the decelerator frame 276 for the adjustment desired, the lower bar 282 rests freely upon a pair of machine screws 292 disposed adjacent the ends of the bar and threadedly engaging lugs 293 and 294, respectively, projecting from the bridge 208. By appropriately rotating the screws 292, the height and transverse inclination of the decelerator structure 276 can be adjusted and varied. To position the accelerator frame in a fore and aft dimension, the center portion of the bar 282 is provided with a stud 296 projecting therefrom and through the center of an adjusting bar 297. The stud 296 is related to the adjusting bar by a spherically contoured washer 298 and lock nut 299 for securing the parts in position.

By appropriately rotating the nut 299, the lower bar 282 of the decelerator frame can be moved toward and away from the adjusting bar 297. Yet, since the threaded end of the stud slides freely within the adjusting bar 297, this adjustment is most effective only in tension, and to produce some rotation about an axis approximately parallel to the direction of the magnetic field, there are provided adjusting screws 301 and 302 passing through the bridge and engaging the lower bar 282, being clamped in position by lock nuts 303 and 304, respectively. Either simultaneous or differential motion of the adjusting screws 301 and 302 can be utilized accurately to position the decelerator mechanism.

But in addition, a further transverse translational adjustment is provided. For that reason, the adjusting bar 297 at opposite ends is abutted by aligned adjusting screws 305 and 306, respectively, each screwed into one of a pair of brackets 307 on the bridge frame 208 and when tightened and loosened respectively effective to translate the decelerator frame 276 accordingly.

All of these adjustments so far described are effective adjacent the lower end of the decelerator frame. To accommodate the motions produced by such adjustments, yet to afford a reasonable and effective support to the upper part of the decelerator frame, the rectangular frame 277 is fabricated with a projecting lug 308 carrying a stud 309 provided with a pair of jam nuts 311 and 312, respectively, designed to engage a two-part U-clamp 313 riding upon the stud 309 and having depending portions engaging the top bar 281 of the decelerator frame 276. By the provision of this structure and described adjustments, there is afforded a decelerator arrangement that can be accurately set prior to the beginning of operation and that can from time to time be reset in order to compensate for any changes after initial operation.

Referring to Figs. 2 and 5 because of the difficulties due to electron oscillation, substantially the entire source unit is encased in electron oscillation shields. The inner shield preferably comprises upper and lower folded sheets 314 and 315, respectively, of relatively heavy gauge metal contoured to define a dihedral angle corresponding substantially with the convergence of the side walls 28 and 29 and appropriately secured thereto. At suitable points on the exterior periphery of the pairs of side flanges 316 and 317 of the shields 314 and 315 there are provided projecting fins 318 of the type shown in the copending application of Oppenheimer et al., Serial No. 645,465, now U.S. Patent No. 2,874,295, issued February 17, 1959.

Overlying the inner shields 314 and 315 are outer side shields 319 and 321, respectively, extended to be supported at one end on the face plate 16 and at the other end by tabs 322 pierced by fastenings 323 engaging the frame 277. Each of the outer shields 319 and 321 is at intervals embossed to provide an elongated cup-like projection 324 affording electrical clearance but overlying in the direction of the magnetic field, the adjacent one of the fins 318 disposed adjacent thereto and mounted on the inner shields 314 and 315. Also at intervals on its surface, each of the side shields 319 and 321 is appropriately pierced to provide a plurality of apertures 325 to facilitate the pumping of the mechanism to reduce the interior pressure thereof and the groups of apertures 325 are overlain by applied straps 326, for example, secured by fastenings 327 to the subjacent sheets.

Referring to Fig. 5, there is shown a top shield 328 constituted of a separate sheet extending over the outturned margins of the side shields 319 and 321 and connected thereto through spacers 330. Furthermore, the side shields 319 and 321 are continued and augmented by a bottom shield 331 secured through spacers 332 to the lower outturned flanges on the side shields in a fashion quite comparable to the manner of fastening the top shield 328.

Reference has heretofore been made to cooling various portions of the structure and to the conduction of electrical current thereto. For those purposes, certain conductors and water leads are passed through the face plate 16. For example, suitable leads 351 and 352 for the filament anchor blocks 83 and 84 of Fig. 13 are carried through the insulating bushings 19 and 21 and the comparable leads 353 and 354 pass through suitable seals 356 to the interior of the tank. The leads and conductors as described extend to the appropriate portions of the mechanism.

With the source unit described herein, there is provided a device that because of its multiple or four-arc construction is capable of processing a large quantity of material for separation, that because of its removable or replaceable cathodes can be depended upon to operate for a protracted period without more than insignificant or minor interruption and then only in part, and one that is provided with an appropriate construction readily lending itself to initial accurate setting of the various electrodes as well as to subsequent resetting of the electrodes when warping and distortion inevitable after operation have disarranged the parts. In general, the described unit is electrically and mechanically an improvement over prior devices and provides for relatively long trouble free periods of operation.

What is claimed is:

1. In a calutron comprising a substantially vacuum-tight vessel having means for evacuating said vessel, electromagnetic ion separating mechanism in said vessel including an ion source comprising an arc chamber, an electron emitting cathode located in position to cooperate with said arc chamber to produce an arc discharge in said arc chamber, a support for said cathode located entirely within said vessel, and means including an air lock for effecting removal and replacement of said cathode without breaking the vacuum in said vessel.

2. In a calutron comprising a substantially vacuum-tight vessel having means for evacuating said vessel, electromagnetic ion separating mechanism in said vessel including an ion source comprising an arc chamber, an electron emitting cathode located in position to cooperate with said arc chamber to produce an arc discharge in said arc chamber, a support for said cathode located entirely within said vessel, said support including releasable clamping means effective to provide mechanical and electrical connections to said cathode, and tool mechanism extending through a wall of said vessel in vacuum-sealed relation thereto effective to operate said releasable clamping means.

3. In a calutron comprising a substantially vacuum-tight vessel having means for evacuating said vessel, electromagnetic ion separating mechanism in said vessel including an ion source comprising an arc chamber, an electron emitting cathode located in position to cooperate with said arc chamber to produce an arc discharge in said arc chamber, a support for said cathode located entirely within said vessel, said support including releasable clamping means effective to provide mechanical and electrical connections to said cathode, and tool mechanism extending through a wall of said vessel in vacuum-sealed relation thereto effective to operate said releasable clamping means, a vacuum lock chamber in alignment with said cathode including a valve at the inner end thereof, a supporting tool operable through said chamber and effective to retract said cathode into said chamber, whereby said cathode may be withdrawn from said vessel and replaced without breaking the vacuum in said vessel.

4. For use as a replaceable element in a calutron vessel, a cartridge-type cathode structure comprising a shouldered body having a pair of juxtaposed longitudinal conducting portions insulated from each other, an electron emitting filament element at one end of said body secured in conducting relation between said conducting portions, and a tool engageable support at the opposite end of said body.

5. For use as a replaceable element in a calutron vessel, a cartridge-type cathode structure comprising a shouldered body formed of a pair of longitudinally juxtaposed conducting blocks electrically separated by an interposed layer of insulating material, an electron emitting U-shaped filament element at one end of said body with the respective legs thereof attached in conducting relation to said blocks, a shield plate secured to said body and overlying said filament, and a tool engageable support at the opposite end of said body, said support comprising a member having a laterally extending projection for cooperation with a tool having a bayonet type socket.

6. In combination in a vacuum-tight calutron tank, a support for a cartridge-type cathode comprising a pair of blocks insulated from each other, means for maintaining said blocks at different electric potentials, a pair of spaced-apart posts extending from said blocks and defining therebetween a space for receiving a cartridge-type cathode, adjustable clamping elements respectively carried by said posts and movable toward and away from said blocks, a shouldered cathode body having a cathode carrying portion movable into the space between said posts, the shoulders on said body engageable with said posts to position the cathode in predetermined position.

7. In combination in a vacuum-tight calutron tank, a support for a cartridge-type cathode comprising a pair of blocks insulated from each other, means for maintaining said blocks at different electric potentials, a pair of spaced-apart posts extending from said blocks and defining therebetween a space for receiving a cartridge-type cathode, adjustable clamping elements respectively carried by said posts and movable toward and away from said blocks, a shouldered cathode body having a cathode carrying portion movable into the space between said posts, the shoulders on said body engageable with said posts to position the cathode in predetermined positions, an air lock in the wall of said tank aligned with said support, a tool structure axially and rotatably movable in said air lock in sealed relation therewith and having means operable to effect clamping and unclamping movement of said clamping elements.

8. In combination in a vacuum-tight calutron tank, a support for a cartridge-type cathode comprising a pair of blocks insulated from each other, means for maintaining said blocks at different electric potentials, a pair of spaced-apart posts extending from said blocks and defining therebetween a space for receiving a cartridge-type cathode, adjustable clamping elements respectively carried by said posts and movable toward and away from said blocks, a shouldered cathode body having a cathode carrying portion movable into the space between said posts, the shoulders on said body engageable with said posts to position the cathode in predetermined positions, an air lock in the wall of said tank aligned with said support, a tool structure axially and rotatably movable in said air lock in sealed relation therewith and having means operable to effect clamping and unclamping movement of said clamping elements and means for effecting rigid engagement with said cathode body.

9. In combination in a vacuum-tight calutron tank, a support for a cartridge-type cathode comprising a pair of blocks insulated from each other, means for maintaining said blocks at different electric potentials, a pair of spaced-apart posts extending from said blocks and defining therebetween a space for receiving cartridge-type cathode posts, adjustable clamping elements respectively carried by said posts and movable toward and away from said blocks, a shouldered cathode body having a cathode carrying portion movable into the space between said posts, the shoulders on said body engageable with said posts to position the cathode in predetermined positions, an air lock in the wall of said tank aligned with said support, a tool structure axially and rotatably movable in said air lock in sealed relation therewith and having means operable to effect clamping and unclamping movement of said clamping elements and means for effecting rigid engagement with said cathode body whereby said cartridge-type cathode may be guidedly moved into and out of said air lock, a valve at the inner end of said air lock whereby said air lock may be sealed from the interior of said tank for subsequent removal and replacement of said cartridge-type cathode.

References Cited in the file of this patent

UNITED STATES PATENTS

| 2,277,024 | Ruska | Mar. 17, 1942 |
| 2,319,061 | Hillier | May 11, 1943 |
| 2,378,962 | Washburn | June 26, 1945 |